(12) United States Patent
Maretti et al.

(10) Patent No.: US 11,433,570 B2
(45) Date of Patent: Sep. 6, 2022

(54) METHOD AND A TOOL FOR ASSEMBLING A FEMALE MOULD AND A FEMALE MOULD ARRANGEMENT

(71) Applicant: SACMI COOPERATIVA MECCANICI IMOLA SOCIETA' COOPERATIVA, Imola (IT)

(72) Inventors: Piero Maretti, Faenza (IT); Stefano Bergami, Castel San Pietro Terme (IT); Davide Penazzi, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 0 days.

(21) Appl. No.: 17/347,818

(22) Filed: Jun. 15, 2021

(65) Prior Publication Data

US 2021/0308911 A1    Oct. 7, 2021

Related U.S. Application Data

(63) Continuation of application No. 16/085,171, filed as application No. PCT/IB2017/051506 on Mar. 15, 2017, now Pat. No. 11,065,784.

(30) Foreign Application Priority Data

Mar. 15, 2016    (IT) ........................ 102016000026982

(51) Int. Cl.
*B29C 33/30* (2006.01)
*B29C 43/36* (2006.01)
(Continued)

(52) U.S. Cl.
CPC ............ *B29C 33/304* (2013.01); *B25B 11/02* (2013.01); *B25B 13/04* (2013.01); *B25B 13/065* (2013.01);
(Continued)

(58) Field of Classification Search
CPC ..... B29C 33/30; B29C 33/304; B29C 33/303; B25B 11/02; B25B 23/0085; B25B 13/04; B25B 13/065
See application file for complete search history.

(56) References Cited

U.S. PATENT DOCUMENTS 2,881,478 A    4/1959  Gruenberg
5,096,404 A    3/1992  Janos et al.
(Continued)

FOREIGN PATENT DOCUMENTS

AT       387181       12/1988
CN       104023930    9/2014
(Continued)

*Primary Examiner* — Robert B Davis
(74) *Attorney, Agent, or Firm* — Pearne & Gordon LLP

(57) ABSTRACT

A pre-assembled female mould arrangement for being installed on a moulding machine, the pre-assembled female mould arrangement comprising:
an annular forming element, extending about an axis and delimiting a forming cavity about said axis;
a plate element, which delimits the forming cavity transversely to said axis;
a peripheral annular component that surrounds at least partially the annular forming element;
a supporting base;
a fastening element which is so mounted as to render the annular forming element fixed relative to the plate element.

8 Claims, 12 Drawing Sheets

(51) Int. Cl.
  *B25B 23/00* (2006.01)
  *B25B 13/04* (2006.01)
  *B25B 13/06* (2006.01)
  *B25B 11/02* (2006.01)
  *B29L 31/56* (2006.01)
  *B29C 43/42* (2006.01)

(52) U.S. Cl.
  CPC .......... *B25B 23/0085* (2013.01); *B29C 33/30* (2013.01); *B29C 43/36* (2013.01); *B29C 33/303* (2013.01); *B29C 43/42* (2013.01); *B29L 2031/565* (2013.01)

(56) References Cited

U.S. PATENT DOCUMENTS

| | | | |
|---|---|---|---|
| 5,786,079 | A | 7/1998 | Alieri |
| 7,425,293 | B2 | 9/2008 | Parrinello et al. |
| 7,431,582 | B2 | 10/2008 | Rote et al. |
| 7,556,488 | B2 | 6/2009 | Mattice et al. |
| 7,934,920 | B2 | 5/2011 | Rote et al. |
| 8,469,695 | B2 | 6/2013 | Rote et al. |
| 8,931,770 | B1 | 1/2015 | Kaminski |
| 9,056,436 | B2 | 6/2015 | Yagauchi |
| 11,241,808 | B2 * | 2/2022 | Penazzi .................. B29C 43/42 |
| 2004/0166193 | A1 | 8/2004 | Parinello et al. |
| 2006/0284339 | A1 | 12/2006 | Mattice et al. |
| 2006/0286190 | A1 | 12/2006 | Rote |
| 2013/0156880 | A1 | 6/2013 | Kim |
| 2013/0270778 | A1 | 10/2013 | Chen |
| 2014/0294556 | A1 | 10/2014 | Sandercock et al. |
| 2014/0377392 | A1 | 12/2014 | Taguchi |

FOREIGN PATENT DOCUMENTS

| | | |
|---|---|---|
| DE | 3149745 | 7/1983 |
| EP | 1585623 | 10/2005 |
| EP | 2796264 | 10/2014 |
| GB | 2496162 | 5/2013 |
| JP | H05169455 | 7/1993 |
| RU | 2406605 | 12/2010 |
| RU | 2412807 | 2/2011 |
| RU | 2570432 | 12/2015 |
| WO | 9603269 | 2/1996 |

\* cited by examiner

METHOD AND A TOOL FOR ASSEMBLING A FEMALE MOULD AND A FEMALE MOULD ARRANGEMENT

FIELD OF THE INVENTION

The invention relates to a method and a tool for assembling a female mould on a moulding machine, the female mould being suitable for co-operating with a male mould in order to obtain a concave object, particularly a cap of a container. The female mould according to the invention is particularly suitable for being used for compression moulding objects made of polymeric material. The invention further relates to a pre-assembled female mould arrangement which may be used in a moulding machine of the type mentioned above.

DESCRIPTION OF RELATED ART

In the machines intended to produce caps by compression moulding, it is known to use a female mould provided with a forming cavity inside which a male mould element can be received. The male mould element is suitable for interacting with the female mould in order to obtain the cap. The known female mould comprises a plate, which delimits a bottom surface of the forming cavity, and an annular forming element, which delimits a lateral surface of the forming cavity. The known female mould further comprises a ring, which is arranged externally of the plate and of the annular forming element.

The plate and the ring are supported by a support which is fixed to a stem of an actuator of the moulding machine. The actuator is configured to move the female mould with respect to the male mould along a moulding direction, so that the female mould moves towards, or alternatively away from, the male mould.

The female mould further comprises a locking nut, provided with an internal thread which engages with an external thread formed on the support. When screwed on the support, the locking nut abuts against a protruding portion of the annular forming element, so as to exert a clamping force that pushes the annular forming element against the plate. Due to the force exerted by the locking nut, the plate is in turn pushed against the support of the female mould. The components of the female mould are thus arranged in a fixed position relative to the stem of the actuator.

In order to ensure that the female mould is assembled in a pre-determined angular position on the moulding machine, phasing elements are used, that are interposed between suitable components of the female mould. The phasing elements may comprise pins or other elements which use a prismatic coupling.

The components of the female mould are usually assembled on known moulding machines by initially positioning only the support on the stem of the actuator. The support is then centered with respect to a housing, in which the male mould will be later installed. To this end, a tubular tool is used, which is temporarily installed in the housing of the moulding machine in place of the male mould element. At this point, the support is fixed relative to the stem and the ring, the plate and the annular forming element, together with other possible components of the female mould, such as gaskets or spacers, are positioned one after the other on the support. On the annular forming element, the locking nut is then arranged, which is finally screwed on the support.

The operations described above, through which the components of the female mould are assembled onto the moulding machine, are rather complicated. For each female mould, it is necessary to place a large number of individual components on the moulding machine. These individual components have to be positioned one after the other and according to a pre-determined sequence of installation on the moulding machine. These operations are to be repeated for each female mould provided on the moulding machine, i.e. a high number of times, since on the moulding machine even some tens of female moulds may be provided. Accordingly, a long time is required for assembling all the components of the female moulds on the moulding machine.

In addition, some errors may occur when positioning each component of the female mould on the moulding machine, and such errors are not easily detectable during assembly. In some cases, failures or even damages may occur during operation of the moulding machine, which may depend on the fact that one or more female moulds were not correctly assembled.

Furthermore, when the components of the female mould are positioned one after the other onto the support already centered with respect to the male mould, it might happen that these components are accidentally displaced, thereby jeopardizing the centering accuracy.

A further drawback of the prior art is related to the phasing elements which are used in order that the components of the female mould can be angularly correctly positioned. Such elements, which may comprise for example pins, have non negligible dimensions. Consequently, the components of the female mould in which pins are provided, need to have a thickness greater than a pre-determined minimum value. Furthermore, the pins result in an increase in the costs of the single female mould.

In addition, the pins—or any other prismatic coupling elements provided as an alternative to the pins—are subject to stress, particularly shear stress, and must therefore be properly dimensioned. In most cases this implies that the pins or other coupling elements must have significant dimensions, with consequent increases of costs and thickness of the involved components.

It is an object of the invention to improve assembly operations for assembling a female mould on a moulding machine, particularly on a machine for compression moulding objects made of polymeric material.

A further object is to improve accuracy in assembling the female moulds of moulding machines.

A further object is to reduce the risk of assembly errors which may occur when the female moulds of a moulding machine are assembled.

Still another object is to make less critical the arrangement of the components of the female mould in a pre-determined angular position.

SUMMARY OF THE INVENTION

In a first aspect of the invention, there is provided a method for assembling a female mould on a moulding machine, comprising the steps of:
providing a pre-assembled female mould arrangement, the pre-assembled female mould arrangement comprising a plurality of components including at least a base, a forming device having a forming cavity and a fastening element which renders the forming device fixed relative to the base;
placing the pre-assembled female mould arrangement on a support of the moulding machine;
fixing the pre-assembled female mould arrangement to the support.

The method according to the first aspect of the invention simplifies the assembly operations which must be performed for assembling the female mould on the moulding machine. Instead of assembling the individual components of the female mould one after the other on the moulding machine, in the method according to the first aspect of the invention, the main components of the female mould are pre-assembled prior to being installed on the moulding machine. The pre-assembly operations which allow the pre-assembled female mould arrangement to be obtained, may be performed far away from the moulding machine, for example on a work bench, even long time before being installed on the moulding machine, which results in increased flexibility for the operator. Each pre-assembled female mould arrangement comprises a relatively low number of components, to the assembly of which the operator can pay particular attention, with consequent reduction in the risk of making errors during assembly.

In addition, when the pre-assembled female mould arrangement is prepared on a workbench, the operator has better accessibility to the components to be assembled, compared to the case in which the same components have to be installed individually on the moulding machine. This helps to simplify assembly operations and to increase accuracy thereof.

The forming device may comprise an annular forming element extending about an axis and delimiting the forming cavity about said axis.

The forming device may further comprise a plate element, which delimits the forming cavity transversely to the axis mentioned above.

In an embodiment, the arrangement of the pre-assembled female mould may further comprise a peripheral annular component at least partially surrounding the annular forming element.

In an embodiment, the step of providing a pre-assembled female mould arrangement comprises assembling the components of the pre-assembled female mould arrangement on an assembly tool.

The assembly tool makes easier the assembly operations by the operator and increases accuracy in mutually positioning the female mould components.

The assembly tool may comprise at least one angular positioning element for ensuring that the fastening element is arranged in a pre-determined angular position with respect to the assembly tool.

The assembly tool may further comprise at least one angular reference element for ensuring that the annular forming element is positioned in a pre-determined angular position on the assembly tool.

Owing to the angular positioning element and to the angular reference element, if present, specific components of the female mould can be mounted on the assembly tool in a known and well defined position. This can be exploited subsequently, when the pre-assembled female mould arrangement will be installed on the moulding machine, in order to ensure that certain components of the female mould, the correct angular positioning of which is critical, are suitably installed.

In an embodiment, the components of the pre-assembled female mould arrangement are positioned on the assembly tool with an upside-down orientation with respect to the orientation that these components will have on the moulding machine.

In particular, the components of the pre-assembled female mould arrangement can be positioned on the assembly tool such that the forming cavity is facing downwards.

Thus, the operator can more easily check that the components of the pre-assembled female mould arrangement are correctly positioned relative to each other on the assembly tool, which reduces the risks of errors during assembly operations of the female mould and increases assembly accuracy.

In an embodiment, for providing a pre-assembled female mould arrangement, the fastening element is fastened to the base such that the forming device is blocked between the fastening element and the base.

A pre-assembled female mould arrangement is thus obtained, which is conformed as an independent unit and may be easily handled and installed on the moulding machine.

The fastening element may be particularly conformed as a blocking ring provided with an internal thread, which is screwed on a corresponding external thread of the base.

The step of fastening the fastening element to the base may be carried out while the pre-assembled female mould arrangement is still positioned on the assembly tool.

In particular, the fastening element may be fastened to the base while the assembly tool is held in a stationary position and the base is rotated by means of a screwing tool, particularly conformed as a key.

In order that the assembly tool is held in a stationary position, a protuberance may be grasped, the protuberance being provided on a face of the assembly tool, said face being opposite a further face of the assembly tool facing the base.

This simplifies the operations of clamping the fastening element on the base.

In an embodiment, after that the pre-assembled female mould arrangement has been placed on the support of the moulding machine, the pre-assembled female mould arrangement is centered with respect to a male mould installed on the moulding machine and suitable for co-operating with the female mould in order to obtain an object.

To this end, the female mould and the male mould are moved toward one another, until an engagement position is reached, in which the male mould engages the female mould.

In the engagement position, the pre-assembled female mould arrangement is centered with respect to the male mould, which can be made possible for example by a clearance between the base of the pre-assembled female mould arrangement and the corresponding support present on the moulding machine.

A high centering precision is in this way ensured, because the components of the pre-assembled female mould arrangement are already stably arranged in a fixed position relative to each another when the pre-assembled female mould arrangement is centered with respect to the male mould. There is therefore no risk that the components of the pre-assembled female mould arrangement can move relative to one another while the centering operation is being performed, which would compromise accuracy of the centering operation.

In an embodiment, after the pre-assembled female mould arrangement has been placed on the support of the moulding machine, there is provided arranging the pre-assembled female mould arrangement in a pre-determined angular position about a moulding axis along which the male mould and the female mould are mutually movable.

This may be done by using a phasing tool that engages with a reference part fixed relative to the pre-assembled female mould arrangement and with a further reference part provided on a component already installed on the moulding machine, the further reference part being external to the pre-assembled female mould arrangement.

The reference part, which is fixed relative to the pre-assembled female mould arrangement, may be provided on the fastening element.

The component on which the further reference part is provided may be a component of a male mould adjacent to the male mould which engages with the pre-assembled female mould arrangement to be installed. This component may comprise, for example, an extractor element of the adjacent male mould, the extractor element being configured to remove a formed object from the corresponding male mould.

Owing to the phasing tool, it is possible to avoid use of angular phasing elements, such as pins, directly embedded in the female mould. This simplifies the female mould. Additionally, since a single tool allows many pre-assembled female mould arrangements to be angularly positioned, a cost saving may be obtained with respect to the prior art, in which a pin for each mould had to be used.

In an embodiment, the step of placing the pre-assembled female mould arrangement in a pre-determined angular position, is carried out while the pre-assembled female mould arrangement is engaging with the male mould.

It is thus ensured that undesired movements do not occur while the pre-assembled female mould arrangement is being arranged in the pre-determined angular position. These undesired movements might bring the pre-assembled female mould arrangement in a non-centered configuration with respect to the male mould.

Consequently, accuracy in positioning the pre-assembled female mould arrangement is increased.

In an embodiment, the step of fixing the pre-assembled female mould arrangement to the support is carried out while the pre-assembled female mould arrangement engages with the male mould and/or the phasing tool.

In other words, the operations of fixing the pre-assembled female mould arrangement to the support, centering the pre-assembled female mould arrangement relative to the male mould and/or angular positioning the pre-assembled female mould arrangement on the moulding machine may be performed simultaneously. This results in a significant increase of accuracy in installing the pre-assembled female mould arrangement on the moulding machine, since the possibility of undesired movements of the female mould components during the operations mentioned above is substantially eliminated. In addition, installing the pre-assembled female mould arrangement on the moulding machine is made more rapid.

In a second aspect of the invention, there is provided a pre-assembled female mould arrangement suitable for being installed on a moulding machine, the pre-assembled female mould arrangement comprising:

an annular forming element, extending about an axis and delimiting a forming cavity about said axis;
a plate element, which delimits the forming cavity transversely to said axis;
a peripheral annular component at least partially surrounding the annular forming element;
a supporting base;
a fastening element which is so mounted as to render the annular forming element fixed relative to the plate element.

The pre-assembled female mould arrangement may be prepared by the operator even in a location remote from the moulding machine and even long time before installation thereof on the moulding machine. This allows to obtain several advantages, in terms of flexibility, accuracy and ease of assembly as already mentioned with reference to the first aspect of the invention.

In a third aspect of the invention, there is provided a tool for assembling a pre-assembled female mould arrangement, the pre-assembled arrangement comprising a plurality of components including at least a base, a forming device having a forming cavity, and a fastening element which makes the forming device fixed relative to the base, the tool comprising at least one angular positioning element suitable for engaging with the fastening element for positioning the fastening element in a pre-determined angular position on the tool.

In an embodiment, the tool further comprises at least one angular reference element suitable for engaging with an annular forming element of the forming device in order to position the annular forming element in a pre-determined angular position on the tool. The tool according to the third aspect of the invention allows to increase flexibility of assembly operations for assembling the female mould, in addition to making such operations easier and more accurate, as already discussed with reference to the first aspect of the invention.

BRIEF DESCRIPTION OF THE DRAWINGS

The invention will be better understood and implemented with reference to the attached drawings, which show an exemplifying and non-limiting embodiment, in which.

DETAILED DESCRIPTION OF PREFERRED EMBODIMENTS OF THE INVENTION

Figure 1:
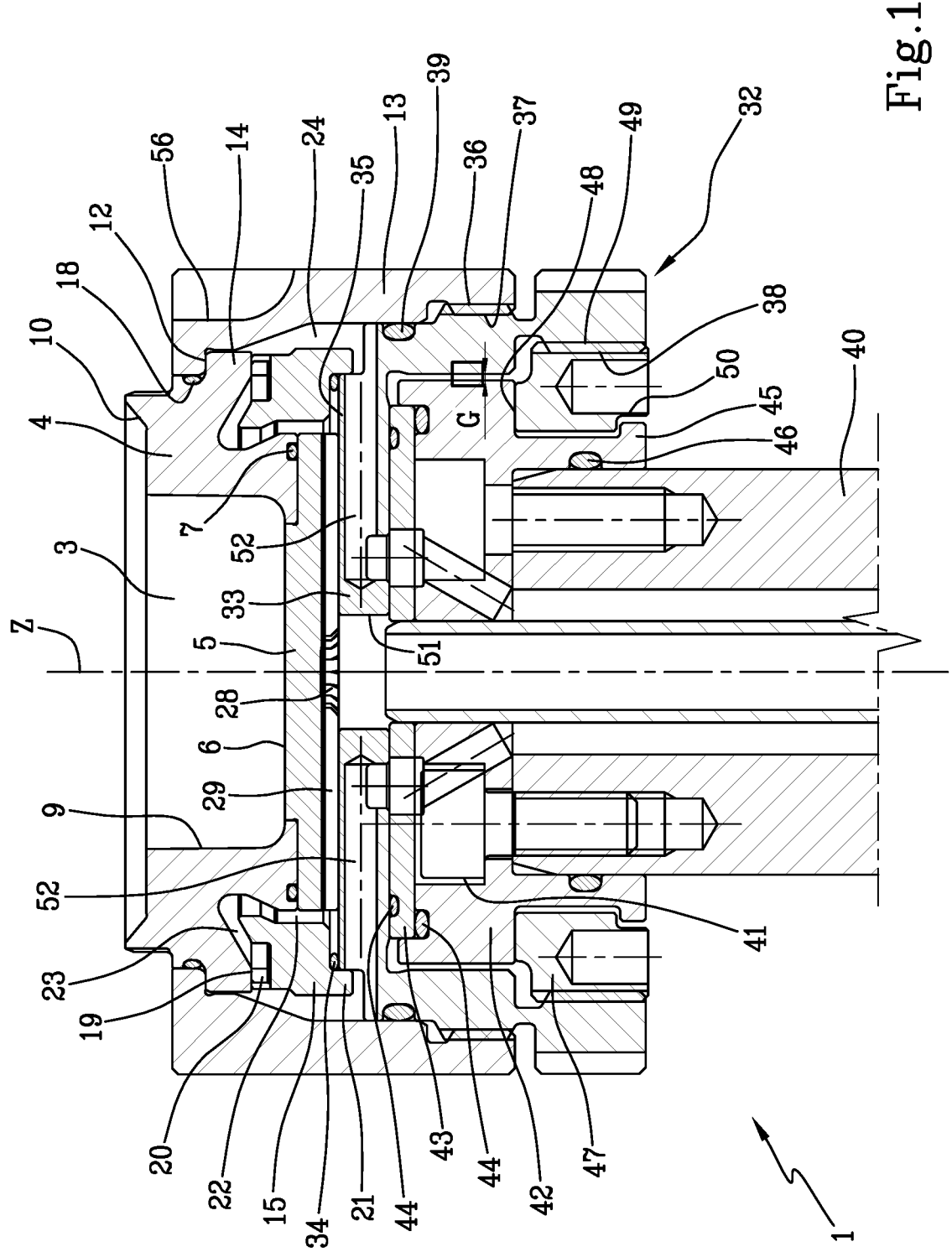
FIG. 1 is a cross section showing a female mould of a moulding machine.

FIG. 1 shows a female mould 1 of a moulding machine, particularly a machine for obtaining objects made of polymeric material by compression moulding.

The female mould 1 is particularly suitable for obtaining a cap for a container, such as for example a bottle. However, what is disclosed hereinafter also applies to moulds for obtaining other concave objects such as containers, or more generally also to moulds for obtaining objects of any other geometry.

The female mould 1 has an axis Z.

Figure 12:
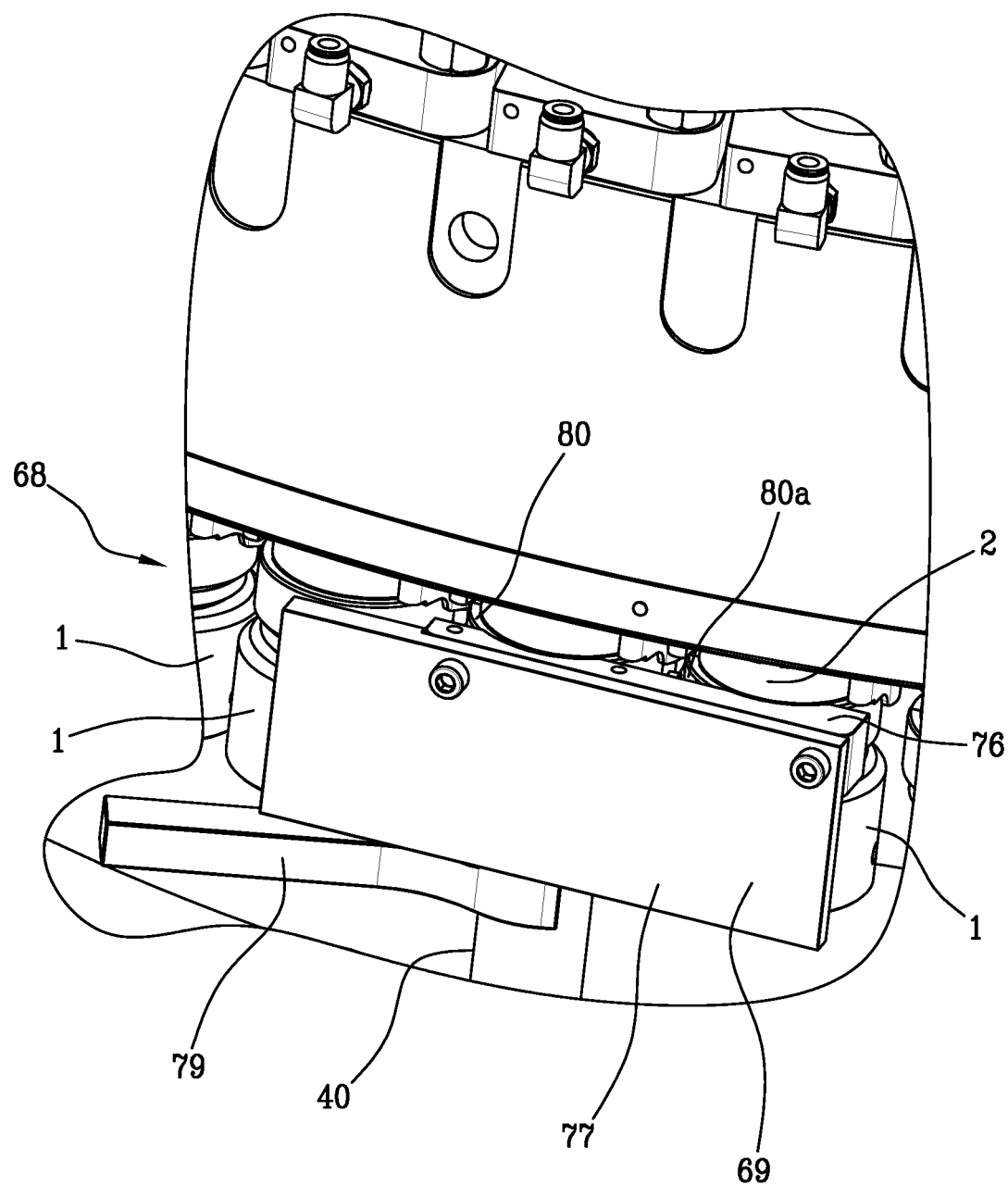
FIG. 12 is a perspective view, showing the phasing tool of FIG. 11 during use.

The female mould 1 is suitable for co-operating with a male mould 2, a portion of which is shown in FIG. 12, in order that the desired object is formed.

The female mould 1 is provided with a forming cavity 3, only schematically shown in FIG. 1, inside which the polymeric material may be shaped during moulding operations.

The female mould 1 comprises a forming device including an annular forming element 4 which extends about the axis Z for delimiting laterally, i.e. about the axis Z, the forming cavity 3.

The forming device further comprises a plate element 5 which delimits the forming cavity 3 transversely to the axis Z, in particular perpendicularly to the axis Z. The plate element 5 has an axis which coincides with the axis Z.

In the example shown, the plate element 5 is shaped as a single piece, particularly made of metal. In other words, the plate element 5 has a one-piece structure. This condition is not necessary, however, and the plate element might be made of two or more pieces.

The plate element 5 has a forming surface 6 which extends transversely, in particular perpendicularly, to the axis Z, and is suitable for contacting the polymeric material to shape the latter. The forming surface 6 defines a transverse surface, which in the example shown is a bottom surface, of the forming cavity 3. The forming surface 6 is suitable for externally shaping a transverse wall of the object that it is desired to form. If the object is a cap, the transverse wall formed by the forming surface 6 is an upper wall of the cap, i.e. a wall which, in use, is arranged in an upper portion of the cap for closing an opening of a container.

The annular forming element 4 is delimited, in an inner portion thereof, by a shaping surface 9, which is suitable for interacting with the polymeric material to be moulded in order to externally shape a lateral wall of the object that it is desired to form.

If the object to be formed is a cap, the lateral wall shaped by the shaping surface 9 may be externally provided with a plurality of knurls aimed at promoting gripping of the cap by a user or a capping machine. The above mentioned lateral wall may be internally provided with one or more fastening elements, e.g. threaded portions, for fastening the cap to the container. The fastening elements are in this case shaped by the male mould 2.

In the example illustrated, the shaping surface 9 of the annular forming element 4 is arranged for externally shaping, in addition to the transverse wall of the object, also a joining zone, in which the lateral wall is joined to the transverse wall of the object. The shaping surface 9 is therefore provided with a curved portion which is connected continuously with the forming surface 6 of the plate element 5.

In an alternative embodiment (not shown), the joining zone, in which the lateral wall is joined to the transverse wall of the object, may be formed by the plate element 5.

In an assembled configuration of the female mould 1, the annular forming element 4 abuts against the plate element 5.

Between the annular forming element 4 and the plate element 5 a sealing ring 7 is interposed, particularly conformed as an O-ring. The sealing ring 7 allows to prevent leakage of liquid between the plate element 5 and the annular forming element 4.

On the side opposite the plate element 5, the annular forming element 4 is provided with a centering element which, in the example shown, comprises a centering projection 10, particularly shaped as a circumferential projection. The centering element is suitable for co-operating with a centering component of the male mould 2 for allowing the female mould 1 to be positioned relative to the male mould 2 in a centered manner with respect to axis Z. To this end, the centering component may be provided with a groove suitable for receiving the centering projection 10. If the centering element has a conformation different from the centering projection 10, the centering component does not have any groove, but it will be suitably shaped in order to be coupled with the centering element used.

The annular forming element 4 is delimited by an abutment surface 12 arranged transversely, in particular perpendicularly, to the axis Z.

During use, the abutment surface 12 faces the male mould 2.

The abutment surface 12 is suitable for engaging with a fastening element, particularly shaped as a blocking ring 13, in order that the annular forming element 4 and the plate element 5 may be fixed to a support (not shown), of the female mould 1.

The abutment surface 12 is formed on a radially projecting portion 14 of the annular forming element 4, the radially projecting portion 14 projecting radially outwardly of the annular forming element 4.

A seal ring 18, particularly conformed as an O-ring, can be interposed between the annular forming element 4 and the blocking ring 13 in order to prevent any fluid leakage between these components.

The female mould 1 comprises a peripheral annular component 15 that surrounds at least partially the annular forming element 4. In particular, in the example illustrated, the peripheral annular component 15 surrounds a lower portion of the annular forming element 4, i.e. a portion of the annular forming element 4 arranged near the plate element 5.

The peripheral annular component 15 further surrounds the plate element 5. The peripheral annular component 15 is delimited, in an upper region thereof, by a resting surface 19, on which the annular forming element 4, in particular the radially projecting portion 14 of the annular forming element 4, may rest.

One or more depressions 20 are formed on the resting surface 19. At the depressions 20, the peripheral annular component 15 is spaced apart from the annular forming element 4.

The peripheral annular component 15 surrounds a portion of the annular forming element 4 having an outer diameter smaller than the inner diameter of the peripheral annular component 15. Thus, between the peripheral annular component 15 and the annular forming element 4 an annular interspace 22 is defined, which extends about the axis Z. Inside the annular interspace 22 a cooling fluid may circulate.

The annular interspace 22 is in fluid communication with one or more transverse passages 23 defined at the interface between the annular forming element 4 and the peripheral annular component 15. The transverse passages 23 are at least partially defined inside the depressions 20.

The transverse passages 23 are in turn in fluid communication with a return space 24 delimited by the blocking ring 13 outside the peripheral annular component 15.

The peripheral annular component 15 further comprises an appendage 21, which projects from a portion of the peripheral annular component 15 that is farthest from the male mould 2.

On a face of the plate element 5 opposite the forming surface 6, there is provided an inlet 28 for a cooling fluid suitable for thermally conditioning the female mould 1.

The inlet 28 may be shaped as a blind cavity suitable for receiving the cooling fluid from a component of the female mould adjacent to the plate element 5.

The inlet 28 is in fluid communication with a plurality of cooling channels 29, also formed on the face of the plate element 5 which is opposite the forming surface 6. By way of example, the cooling channels 29 extend radially from the inlet 28 towards the periphery of the plate element 5. In the example shown, the cooling channels 29 are angularly equidistant.

When the female mould 1 is in an assembled configuration, the cooling channels 29 are in fluid communication with the annular interspace 22.

As shown in FIG. 1, the female mould 1 may further comprise a base 33 for supporting the plate element 5. In the example illustrated, in an assembled configuration of the female mould 1, the plate element 5 is directly resting on the base 33. In particular, the face of the plate element 5, on which the cooling channels 29 are obtained, is in contact with a transverse face 35 of the base 33.

The base 33 is configured to support also the peripheral annular component 15, possibly with the interposition of an annular gasket 34, for example an O-ring.

The base 33 has a substantially concave shape, with a concavity facing the side opposite the forming cavity 3.

The base 33 is provided with an external thread 36 which is suitable for engaging with an internal thread 37 formed on the blocking ring 13, particularly at an end region of the blocking ring 13. Owing to the external thread 36 and the internal thread 37, the blocking ring 13 can be removably anchored to the base 33.

The base 33 is further provided with an internal threaded zone 38, the function of which shall be better described hereinafter. The internal threaded zone 38, in the example shown, is formed at one end 32 of the base 33 opposite the transverse face 35.

An annular gasket 39, shaped for example as an O-ring, is interposed between the blocking ring 13 and the base 33.

The moulding machine comprises an actuator, for example of the hydraulic, electrical or mechanical type, for moving the female mould 1 and the male mould 2 relative to each other. Owing to the actuator, the female mould 1 and the male mould 2 are movable between a spaced position and an engagement position. In the spaced position, the female mould 1 is far from the male mould 2 and a dose of polymeric material can be deposited in the forming cavity 3. In the engagement position, the male mould 2 is engaged inside the forming cavity 3 in such a manner that between the female mould 1 and the female mould 2 a forming chamber is defined, the forming chamber having a shape corresponding to the object that it is desired to obtain.

In the example shown, the actuator is associated with the female mould 1, i.e. the actuator moves the female mould 1 with respect to the male mould 2, which instead remains stationary. In particular, the actuator is configured for moving the female mould 1 in a direction parallel to the axis Z.

As shown in FIG. 1, the actuator comprises a stem 40 having an axis which, in an assembled configuration of the female mould 1, coincides with the axis Z. The stem 40 is movable in a direction parallel to the axis Z.

To the stem 40, a support 42 is fixed by means of a plurality of fastening screws 41, the support 42 being intended to support the base 33. To this end, the support 42 may be provided, in a region of the support 42 proximal to the base 33, with a recess inside which a spacer 43 is at least partially housed. The base 33 rests on the spacer 43. Between the support 42 and the spacer 43, as well as between the spacer 43 and the base 33, respective annular sealing elements 44 may be interposed, for example shaped as O-ring.

In the example shown, the support 42 is intended to rest on an end of the stem 40. A cylindrical edge 45 projects from the support 42, the cylindrical edge 45 being suitable for being arranged outside of the stem 40 in order to center the support 42 with respect to the stem 40.

Between the cylindrical edge 45 and the stem 40, a sealing ring 46, for example shaped as an O-ring, may be interposed.

The female mould 1 further comprises a fastening ring 47, particularly conformed as a locking nut, which surrounds the support 42. More in particular, the fastening ring 47 surrounds the cylindrical edge 45 of the support 42.

The fastening ring 47 is delimited by a contact surface 48 suitable for abutting against a surface which delimits the support 42 transversely, in particular perpendicularly, to the axis Z.

The fastening ring 47 is provided with an external threaded zone 49, which is suitable for engaging with the internal threaded zone 38 of the base 33.

One or more holes 50 are formed on a surface that delimits the fastening ring 47 on the side opposite the contact surface 48. The holes 50 may be blind. The holes 50 are suitable for receiving a protruding element, for example shaped as a pawl, which is fixed relative to a clamping tool through which the fastening ring 47 may be screwed on the base 33. By so doing, the contact surface 48 of the fastening ring 47 is pushed against the support 42 and the base 33 is render fixed relative to the support 42.

The base 33 is provided with a central hole 51 for sending into the cooling channels 29 a cooling fluid coming from the stem 40. The base 33 is further provided with a plurality of transverse conduits 52 through which the cooling fluid, coming from the return space 24, may be caused to flow out of the female mould 1, through appropriate passages formed in the spacer 43, in the support 42 and in the stem 40.

Figure 2:
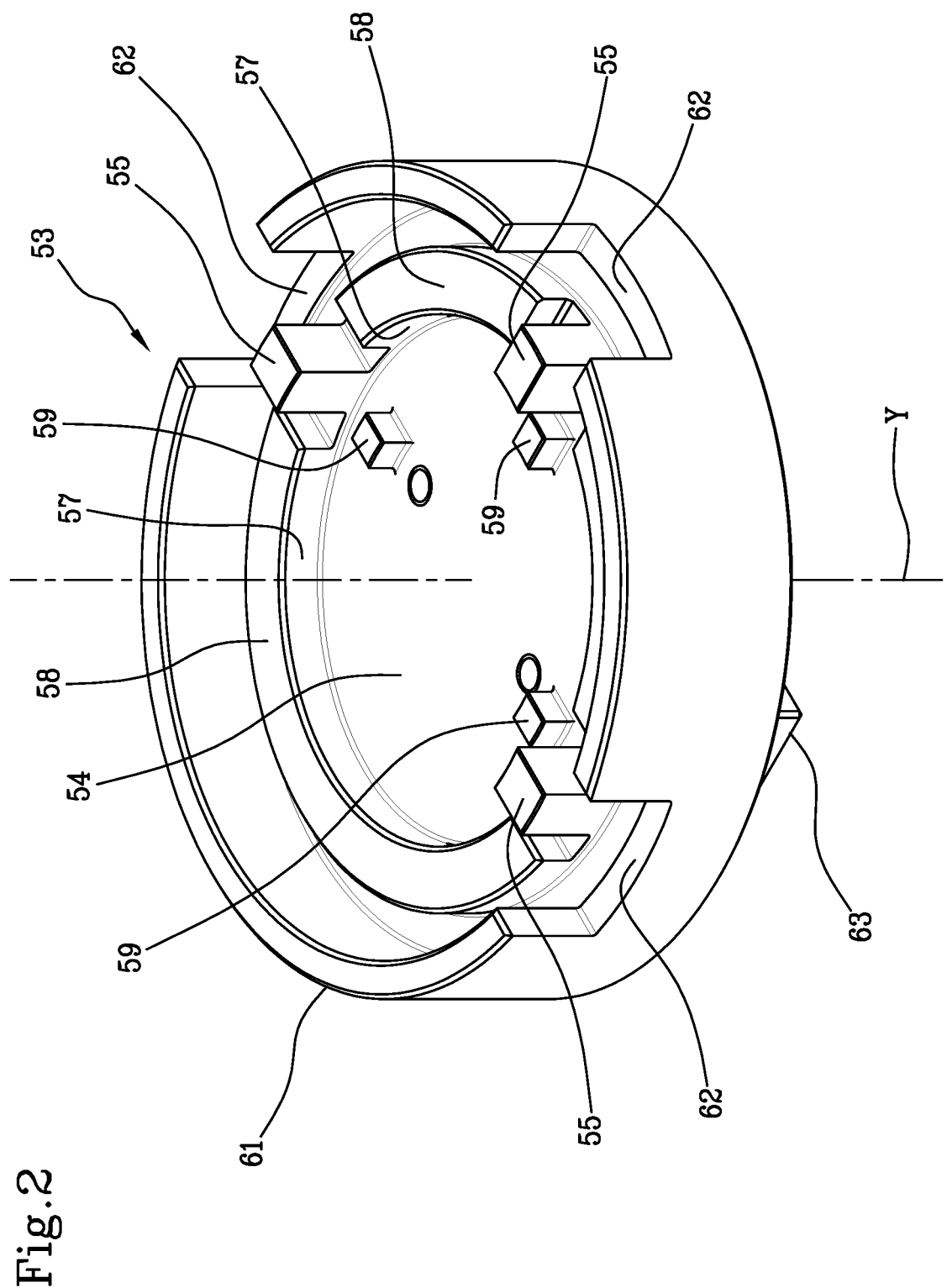
FIG. 2 is a perspective view showing a tool for assembling a pre-assembled female mould arrangement.

FIG. 2 shows an assembly tool 53 which may be used to assemble certain components of the female mould 1, in order that a pre-assembled female mould arrangement is obtained. The pre-assembled female mould arrangement will be subsequently installed on the moulding machine.

The assembly tool 53 comprises a wall 54, which may have a substantially circular shape in plan view. From the wall 54, a plurality of angular positioning elements 55 project, which are suitable for engaging with the blocking ring 13. It is in this way ensured that the blocking ring 13 is arranged in a pre-determined angular position on the assembly tool 53.

The angular positioning elements 55 may be each conformed as a protuberance which projects from the wall 54 and in particular is of a substantially prismatic shape. The angular positioning elements 55 are arranged along a common circumference. In the example depicted, there are provided a first angular positioning element 55, a second angular positioning element 55 and a third angular positioning element 55. The first angular positioning element 55 and the second angular positioning element 55 are separated by an angular distance of 90°. Similarly, the second angular positioning element 55 and the third angular positioning element 55 are separated by an angular distance of 90°. The third angular positioning element 55 and the first angular positioning element 55 are instead separated by an angular distance of 180°.

Each angular positioning element 55 is intended to engage with a reference element, particularly conformed as a recess 56, shown in FIG. 1, formed in the blocking ring 13. In particular, the recesses 56 are formed in a surface of the blocking ring 13 intended to face towards the male mould 2. The recesses 56 penetrate towards the inside of the blocking ring 13 from an outer surface of the latter.

In the example shown, three recesses 56 are provided on the blocking ring 13, the recesses 56 being placed at mutual angular distances that are equal to the angular distances between the angular positioning elements 55.

The angular positioning elements 55 are configured for engaging in the recesses 56 in a univocally determined angular position of the blocking ring 13. In other words, there is one and only one angular position of the blocking ring 13 about the axis Z in which the angular positioning elements 55 may be inserted into the recesses 56.

On the assembly tool 53, between two consecutive angular positioning elements 55, there are provided respective resting elements 57, which are projecting from the wall 54. Each resting element 57 is delimited by a resting surface 58, on which a surface of the blocking ring 13 may rest. The surface of the blocking ring 13 which may rest on the resting surface 58 faces the male mould 2 in use.

The assembly tool 53 may further comprise at least one angular reference element 59 which is suitable for engaging with the annular forming element 4 in order to ensure that the annular forming element 4 is positioned in a pre-determined angular position on the assembly tool 53.

The angular reference element 59 is however not essential for the operation of the assembly tool 53. Accordingly, in an embodiment that is not shown, the assembly tool 53 may be free of angular reference elements 59.

In the example shown, there is provided a plurality of angular reference elements 59, particularly three angular reference elements 59. The angular reference elements 59 may be distributed on a common circumference, particularly arranged internally of, and coaxial with, the circumference along which the angular positioning elements 55 are distributed.

Each angular reference element 59 may be shaped like a tooth that projects from the wall 54.

The angular reference elements 59 may be arranged at mutual angular distances equal to the mutual angular distances that separate the angular positioning elements 55. In particular, the angular distance between a first and a second angular reference element 59 can be 90°, as well as the angular distance between the second and a third angular reference element 59. The angular distance between the third and the first angular reference element 59 may instead be of 180°.

The angular positioning elements 55 can be aligned with the angular reference elements 59. This condition is not necessary, however.

Figure 10:
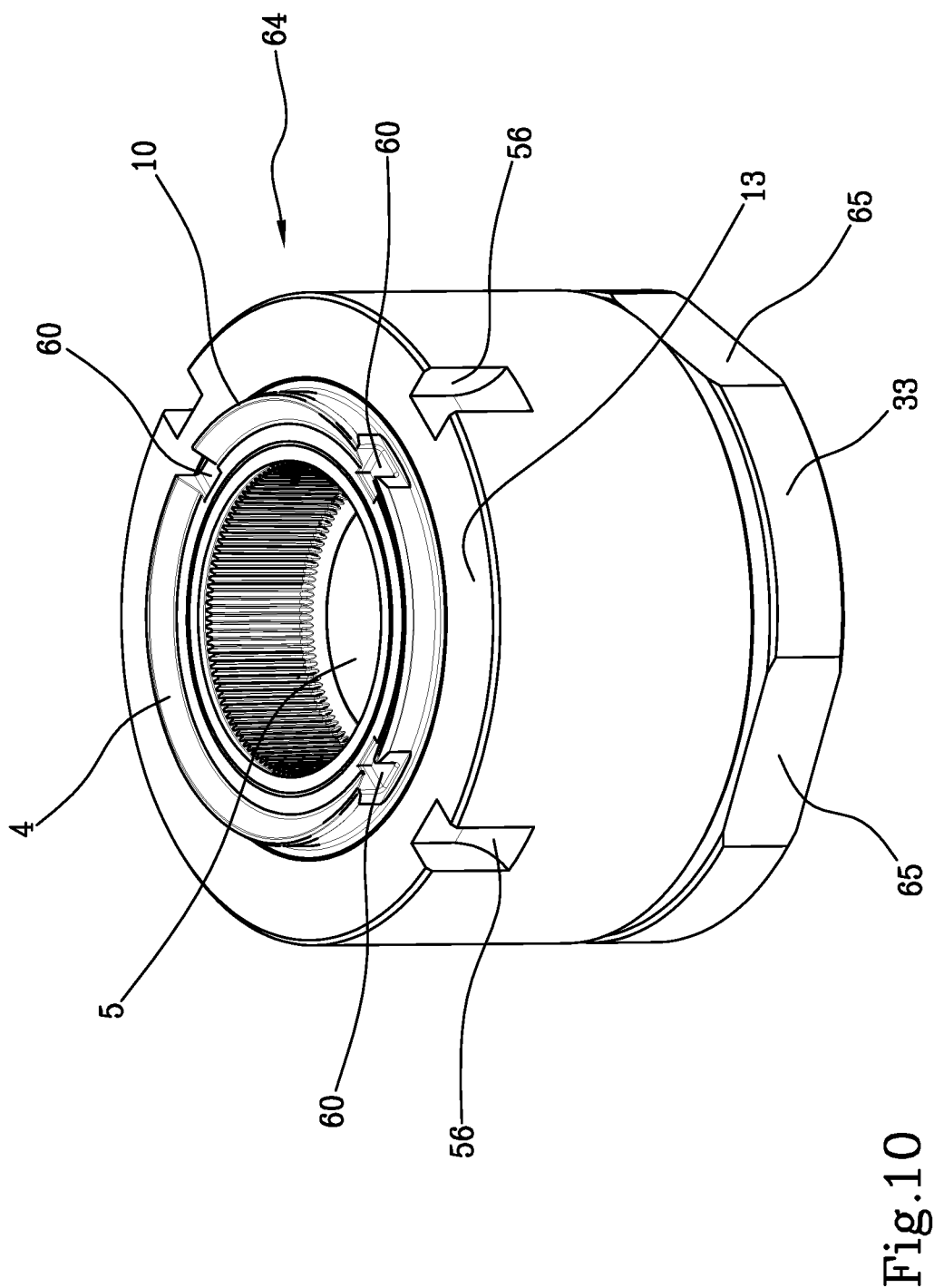
FIG. 10 is a perspective view, showing a pre-assembled female mould arrangement, ready to be installed on a moulding machine.

Each angular reference element 59 is suitable for engaging inside a corresponding reference member, particularly conformed as an indentation 60, shown for example in FIG. 10, which is formed in the annular forming element 4. The indentations 60 are formed on a side of the annular forming element 4 which in use faces the male mould 2. In particular, the indentations 60 may be formed along the centering projection 10, so as to interrupt the centering projection 10.

In the example shown, there are provided three indentations 60 which are placed at mutual angular distances equal to the angular distances that separate the angular reference element 59.

From the wall 54 of the assembly tool 53 a lateral wall 61 is projecting, which may have a cylindrical shape. The angular positioning elements 55 and the angular reference elements 59 are arranged internally of the lateral wall 61.

The lateral wall 61 extends about an axis Y of the assembly tool 53.

The lateral wall 61 is provided with a plurality of openings 62, each of which is aligned with a respective angular positioning element 55 and with a respective angular reference element 59. Owing to the openings 62, the operator can easily check if the blocking ring 13 and the annular forming element 4 are correctly positioned on the assembly tool 53.

The assembly tool 53 is further provided with a protuberance 63 which projects from a face of the wall 54 opposite the further face from which the angular positioning elements 55 and the angular reference elements 59 project. The protuberance 63 may have a prismatic shape, particularly it may be shaped as a prism with a rectangular base.

The protuberance 63 is suitable for being grasped by a clamping tool, for example a vice, so that the assembly tool 53 is held in a stationary position.

FIGS. 3 to 8 show some steps of a method for obtaining a pre-assembled female mould arrangement 64, shown in FIG. 10, by assembling some components of the female mould 1.

Figure 3:
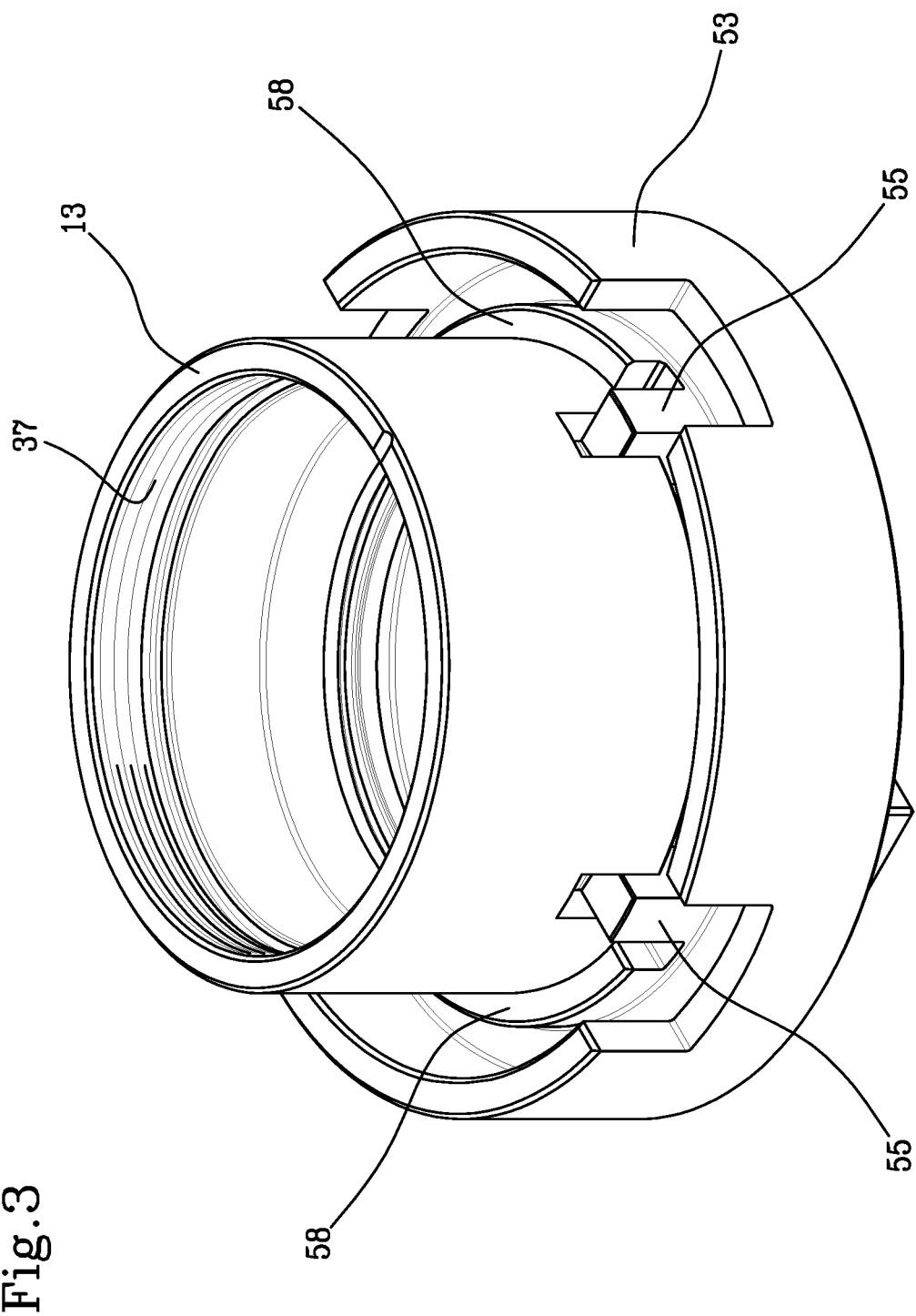
FIG. 3 is a perspective view showing a fastening element of a female mould, positioned on the tool of FIG. 2.

The pre-assembled female mould arrangement 64 is obtained by placing the components to be assembled on the assembly tool 53, said components to be assembled having an upside-down orientation with respect to the orientation that they are intended to have during operation of the female mould 1. As shown in FIG. 3, the blocking ring 13 is initially positioned on the assembly tool 53, in such a manner that an end of the blocking ring 13 which faces the male mould 2 during operation, is in a position adjacent to the wall 54. More particularly, said end of the blocking ring 13 rests on the resting surface 58 of the assembly tool 53. The blocking ring 13 is rotated in such a manner that an angular positioning element 55 is received inside each recess 56. The blocking ring 13 is thus arranged in a univocally defined angular position about the axis Y on the assembly tool 53.

Figure 4:
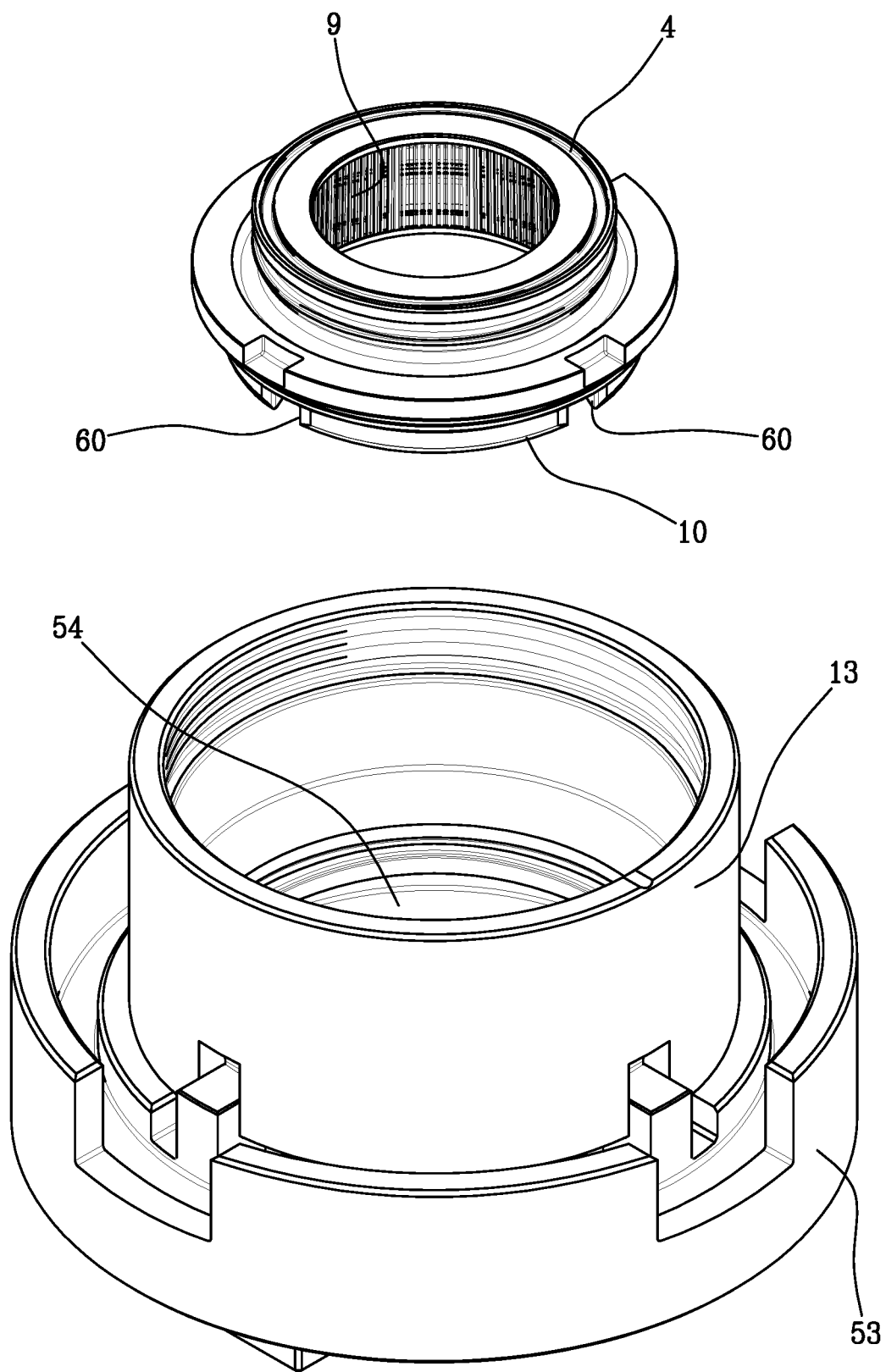
FIG. 4 is a perspective view showing an annular forming element of a female mould, which is about to be positioned on the tool of FIG. 2.

Subsequently, as shown in FIG. 4, the annular forming element 4 is inserted inside the blocking ring 13, which is supported by the assembly tool 53. The seal ring 18 may have already been assembled on the annular forming element 4.

Also the annular forming element 4 is positioned on the assembly tool 53 in an upside-down configuration with respect to its operating configuration on the moulding machine. In particular, the centering projection 10 of the annular forming element 4 faces the wall 54 of the assembly tool 53.

The annular forming element 4 is arranged on the assembly tool 53 in a manner such that each angular reference element 59 projecting from the surface 54 is inserted inside a corresponding indentation 60 of the annular forming element 4. Thus, the angular position of the annular forming element 4 on the assembly tool 53, i.e. the position of the annular forming element 4 about the axis Y, is univocally determined. Furthermore, as shown in FIG. 9, the abutment surface 12 of the annular forming element 4 abuts against the blocking ring 13, which has already been positioned on the annular forming element 4.

The sealing ring 7 may have been associated to the annular forming element 4 before the annular forming element 4 is placed on the assembly tool 53.

Figure 5:
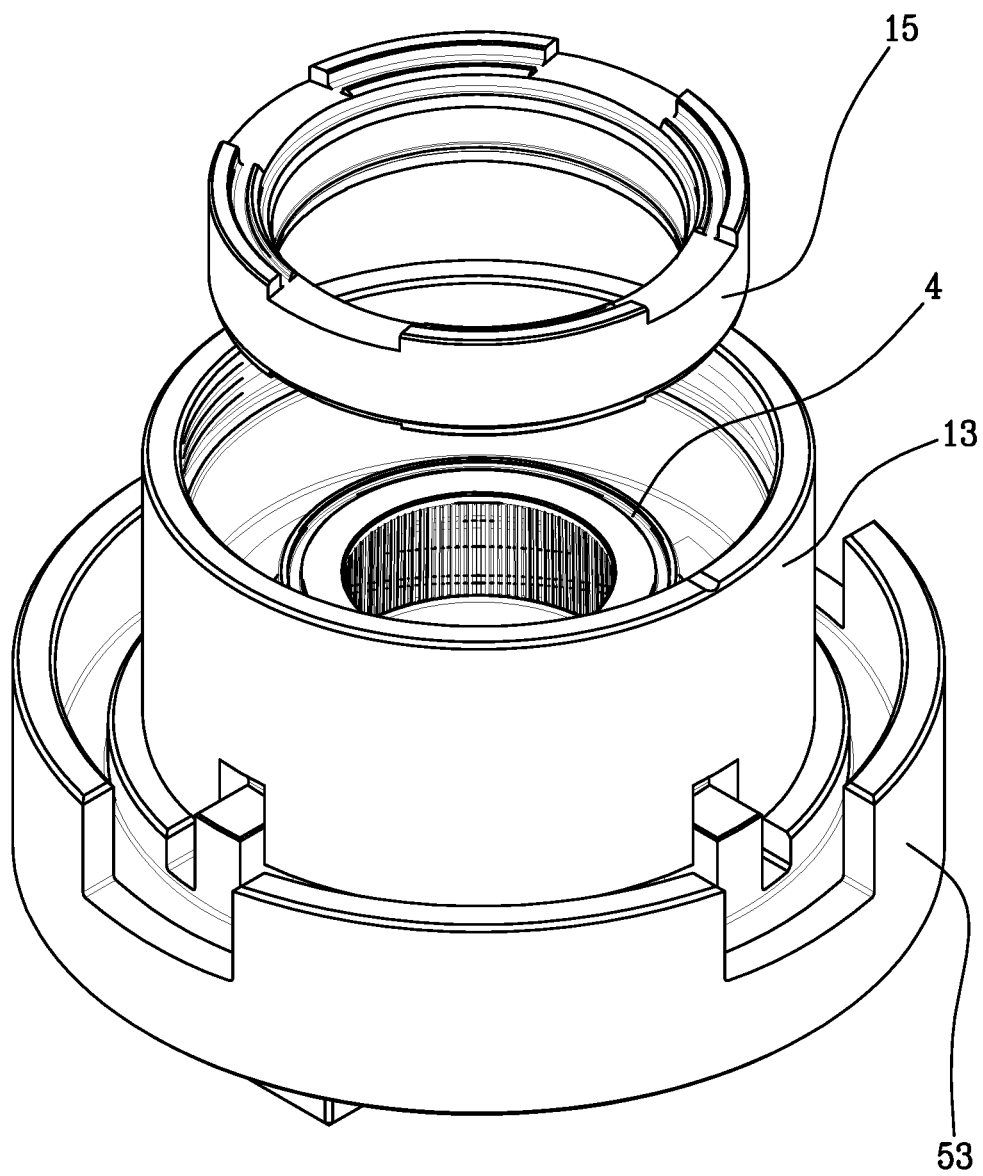
FIG. 5 is a perspective view showing a peripheral annular component of a female mould, which is about to be positioned on the tool of FIG. 2.
Figure 6:
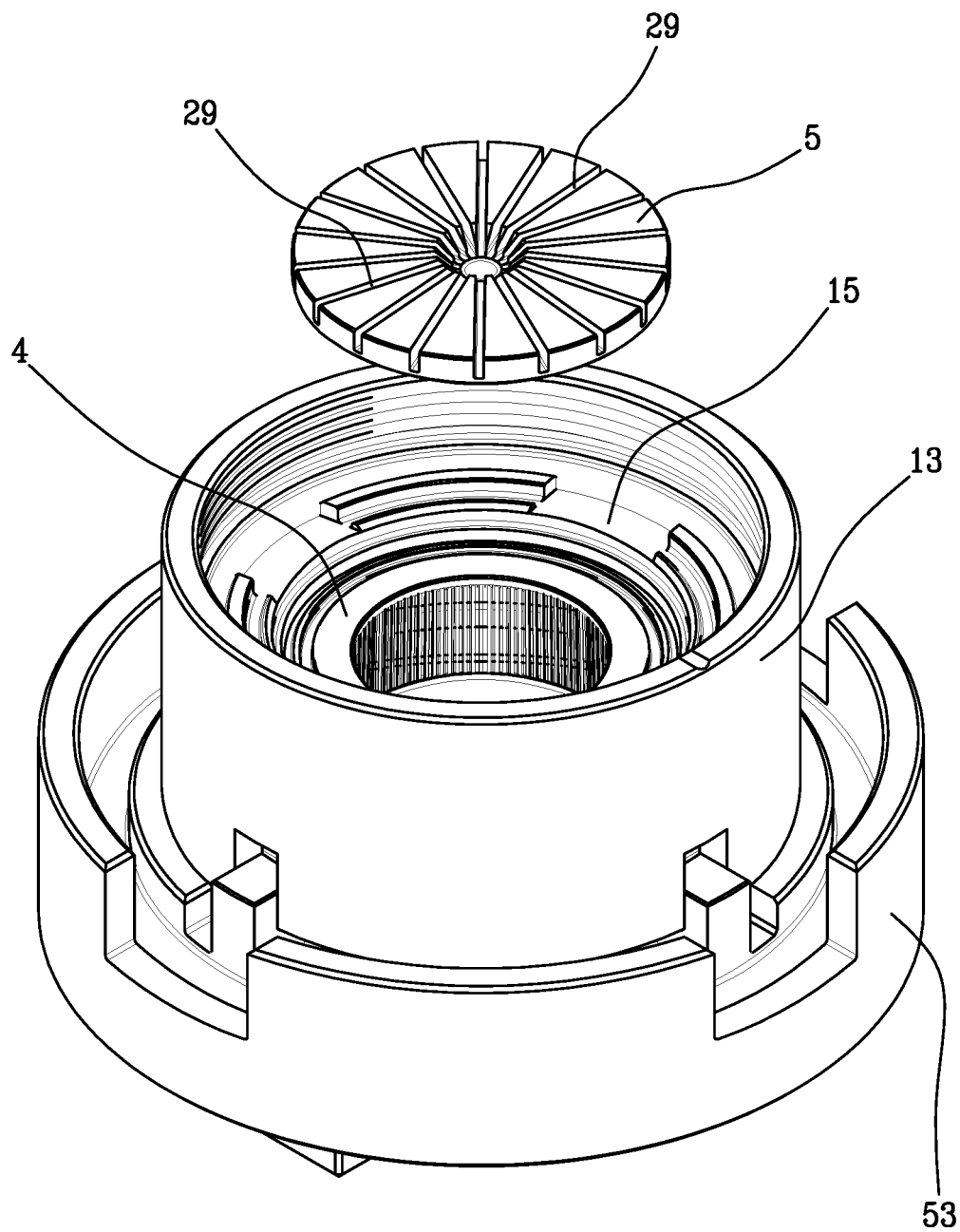
FIG. 6 is a perspective view showing a plate element of a female mould, which is about to be positioned on the tool of FIG. 2.

At this point, as shown in FIG. 5, on the assembly tool 53 (on which the annular forming element 4 and the blocking ring 13 have already been positioned), the peripheral annular component 15 is arranged. Also the peripheral annular component 15 is in an inverted configuration with respect to its operating configuration on the moulding machine. In particular, the depressions 20 face towards the annular forming element 4, i.e.—in the example shown—downwards.

Figure 9:
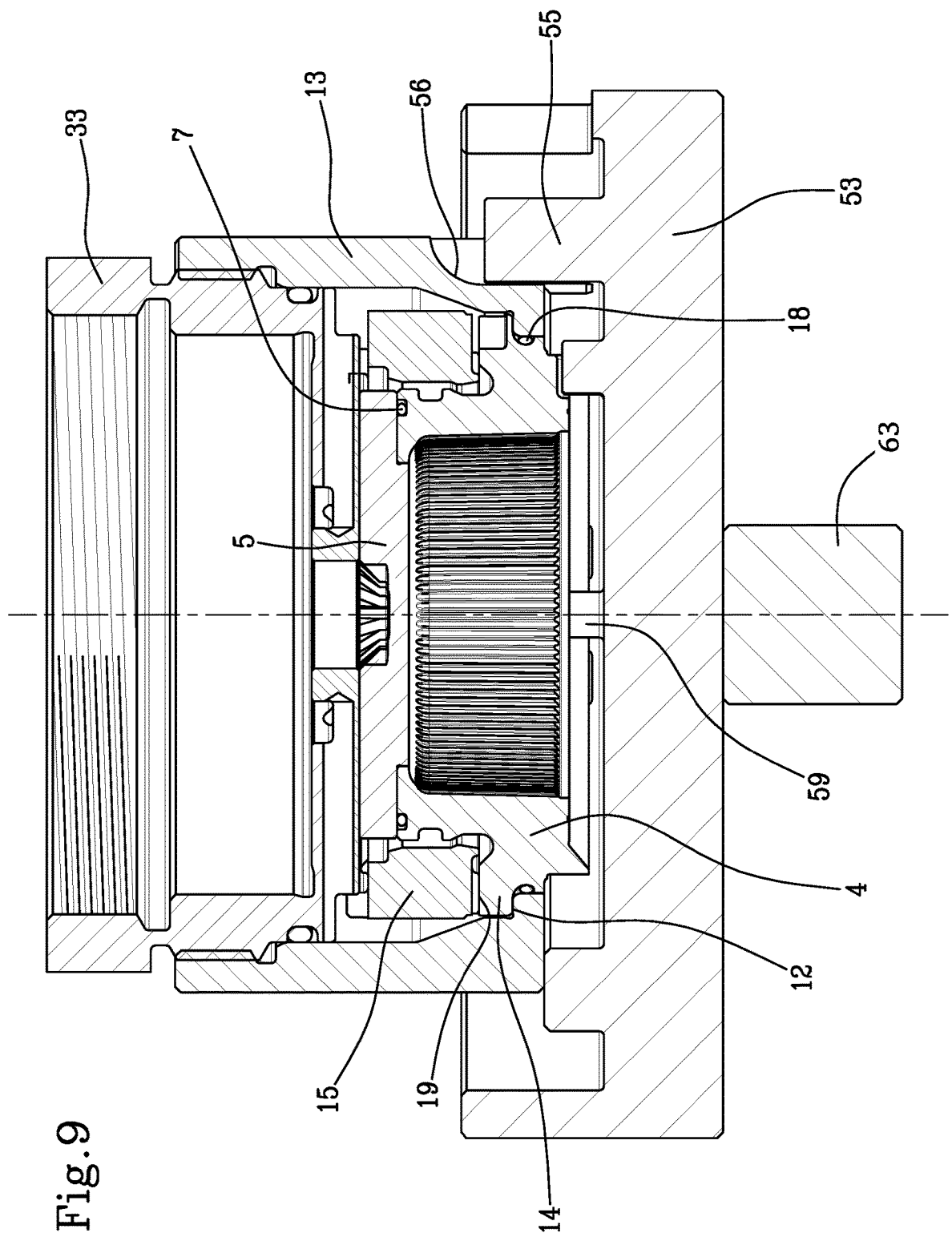
FIG. 9 is a cross section, showing a pre-assembled female mould arrangement, positioned on the tool of FIG. 2.

As shown in FIG. 9, the peripheral annular component 15 has reached its final position on the assembly tool 53 when its resting surface 19 abuts against the radially projecting portion 14 of the annular forming element 4.

The plate element 5 may be now placed onto the assembly tool 53. The plate element 5 rests on the annular forming element 4, as shown in FIG. 9. Also the plate element 5 is positioned onto the assembly tool 53 with an upside-down orientation relative to its orientation during normal operation, as clearly shown in FIG. 6, which shows that the cooling channels 29 face upwards.

Figure 7:
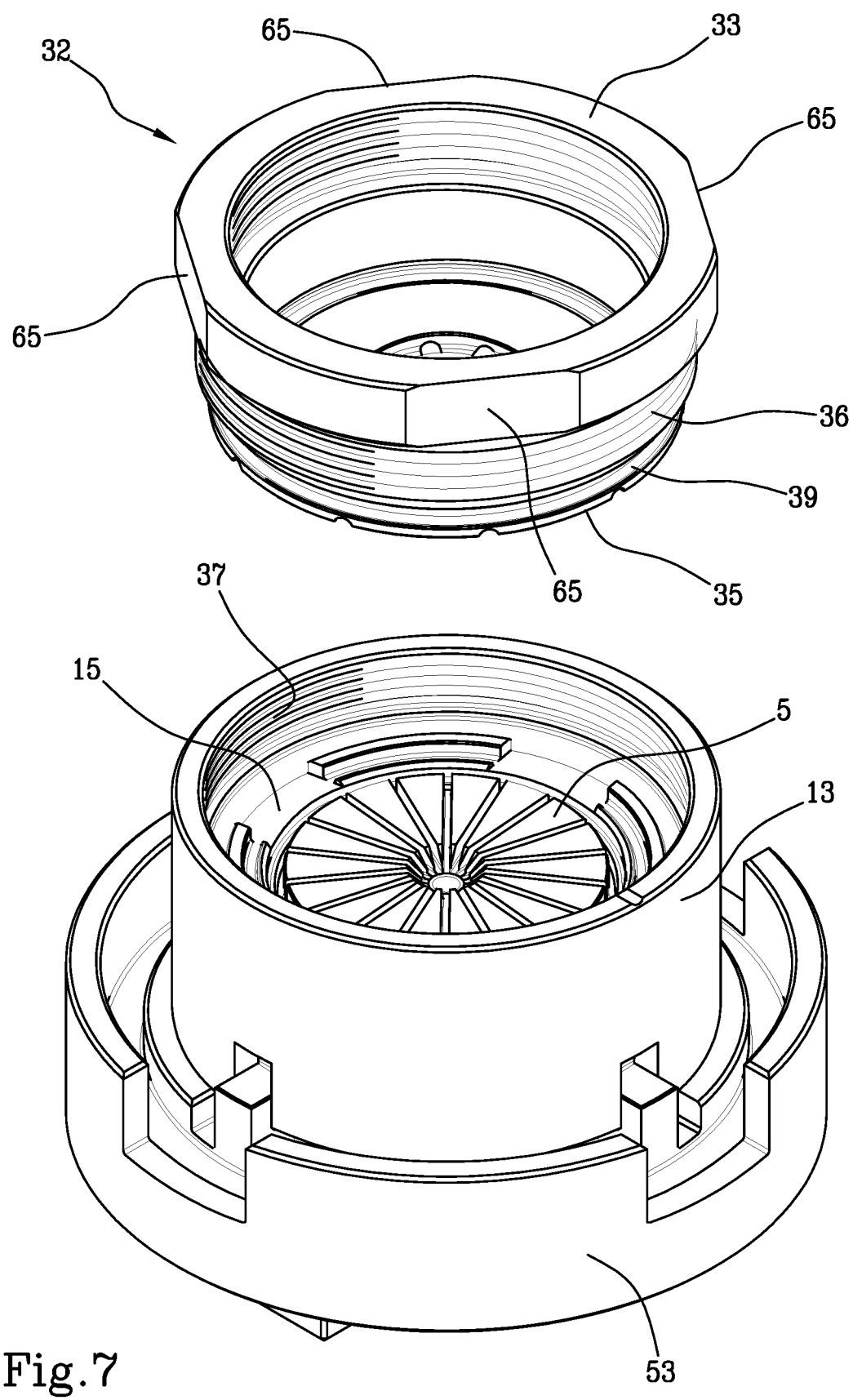
FIG. 7 is a perspective view showing a supporting base of a female mould, which is about to be positioned on the tool of FIG. 2.

Finally, as shown in FIG. 7, the base 33 is positioned on the assembly tool 53, the base 33 being possibly already provided with the annular gasket 39.

The transverse face 35 of the base 33 faces the plate element 5. The base 33 therefore has an upside-down orientation relative to its orientation during operation of the moulding machine.

As shown in FIG. 7, the end 32 of the base 33 is delimited by an outer surface provided with a plurality of flat portions 65. In the example shown, the end 32 is delimited by four flat portions 65. Two adjacent flat portions 65 may identify respective planes perpendicular one to another. Two opposite flat portions 65 may identify respective planes parallel to one another.

The flat portions 65 may be arranged, in plan view, according to the four sides of a square or a rectangle.

Figure 8:
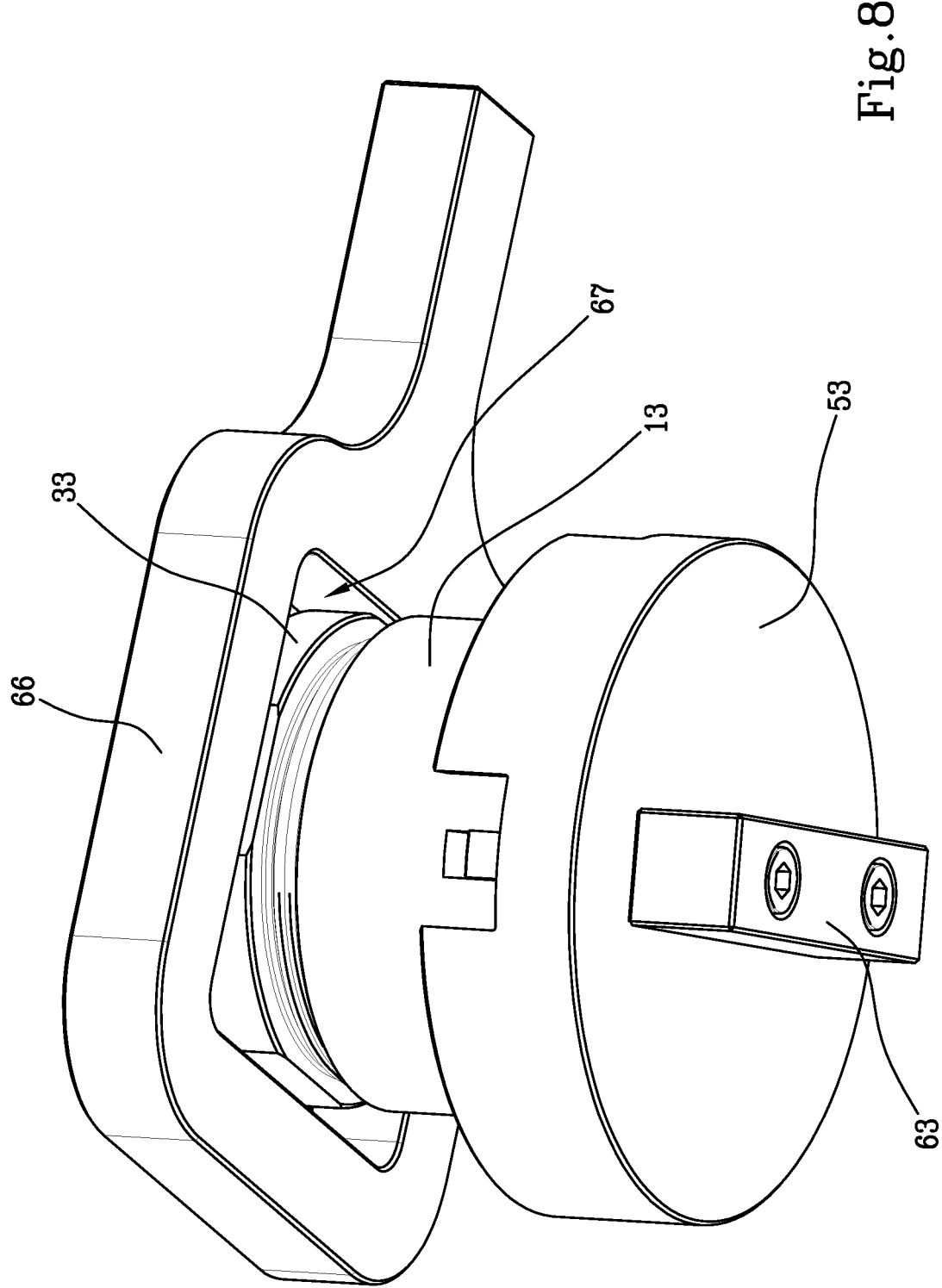
FIG. 8 is a perspective view showing schematically a step of clamping a pre-assembled female mould arrangement.

The flat portions 65 enable a screw key 66, shown in FIG. 8, to engage with the base 33, and in particular with the respective end 32, so that the base 33 is screwed on the blocking ring 13. In particular, the screw key 66 may be provided with an engagement opening 67 delimited by a plurality of sides, at least two of which engage with two opposite flat portions 65 of the base 33. In this manner it is possible to rotate the base 33 about the axis Y, such that the external thread 36 of the base 33 engages with the internal thread 37 of the blocking ring 13. At the same time, the blocking ring 13 is held in a stationary position, for example by means of a clamping tool such as a vice, which grips the protrusion 63 of the assembly tool 53. Since the blocking ring 13 is angularly stationary with respect to the assembly tool 53 owing to the angular positioning elements 55, if the assembly tool 53 is held stationary, also the blocking ring 13 is prevented from rotating.

When the base 33 has been completely screwed on the blocking ring 13, as shown in FIG. 9, the annular forming element 4, the plate element 5 and the peripheral annular component 15 are clamped between the blocking ring 13 and the base 33. The annular forming element 4 is therefore arranged in a fixed position relative to the plate element 5.

The pre-assembled female mould arrangement 64 is thus defined, the pre-assembled female mould arrangement 64 forming an independent unit the components of which are fixed relative to one another. The pre-assembled female mould arrangement 64 may now be removed from the assembly tool 53, as shown in FIG. 10, in order to be installed on the moulding machine, or to be temporarily stored awaiting to be installed on the moulding machine.

In order to install the pre-assembled female mould arrangement 64 on the moulding machine, it is possible to proceed as described below.

The moulding machine is usually configured for supporting a plurality of female moulds 1, which may for example be arranged in a peripheral region of a carousel 68, shown in FIG. 12. The carousel 68 is rotatable about an axis of rotation, in particular arranged vertically. The carousel 68 further supports a plurality of male moulds 2, each of which faces a corresponding female mould 1. As already described previously, each female mould 1 and the corresponding male mould 2 are movable relative to one another between the spaced position and the engagement position.

To assemble the female mould 1 on the stem 40 of the respective actuator, the support 42 is first of all rested on the stem 40. The support 42 is then fixed to the stem 40 by means of fastening screws 41. The spacer 43, which also has an height adjustment function for adjusting the height at which the base 33 shall be positioned, is arranged on the support 42, and also the annular sealing elements 44 are placed in their respective positions.

At this point, while the stem 40 is located in a position that corresponds to the spaced position of the female mould 1 and of the corresponding male mould 2, the pre-assembled female mould arrangement 64 is positioned on the support 42. The base 33 may be screwed on the fastening ring 47, without however completely tightening the base 33 relative to the fastening ring 47.

The support 42 and the components supported by the latter, particularly the pre-assembled female mould arrangement 64, are now moved by the stem 40 towards the engagement position, such that a male element or punch of the male mould 2, penetrates internally of the forming cavity 3.

In this way, the pre-assembled female mould arrangement 64 is centered with respect to the male mould 2, i.e. it is ensured that the female mould 1 and the male mould 2 are aligned along the axis Z.

This centering step is made possible owing to a clearance G, of the radial type, existing between the pre-assembled female mould arrangement 64 and the support 42. More particularly, the clearance G, visible in FIG. 1, is defined between the base 33 and the support 42.

Owing to the clearance G, the pre-assembled female mould arrangement 64 can be moved transversely to the axis Z, such that the axis Z is caused to coincide with an axis of the male mould 2, which is instead stationary.

Figure 11:
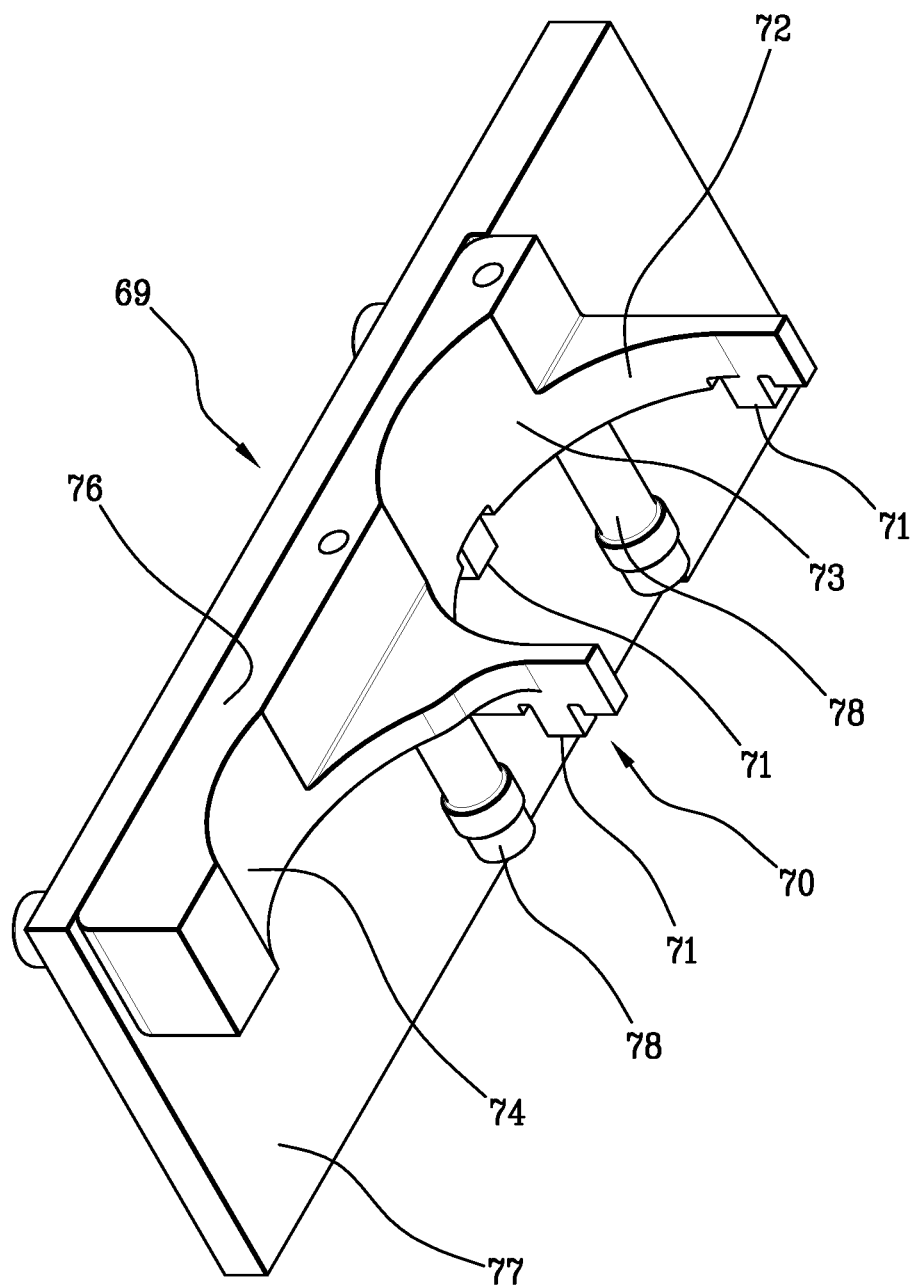
FIG. 11 is a perspective view, showing a phasing tool for installing a pre-assembled female mould arrangement on a moulding machine.

After positioning the pre-assembled female mould arrangement 64 on the support 42 and centering the pre-assembled female mould arrangement 64 with respect to the male mould 2, the pre-assembled female mould arrangement 64 may be placed in a pre-determined angular position about the axis Z. To this end, a phasing tool 69 can be used, the phasing tool 69 being shown in FIG. 11.

The phasing tool 69 comprises an angular positioning device 70 suitable for engaging with a reference part, the reference part being fixed relative to the pre-assembled female mould arrangement 64. The angular positioning device 70 may be particularly configured to engage with the recesses 56 provided on the blocking ring 13 of the pre-assembled female mould arrangement 64. To this end, the angular positioning device 70 may comprise a plurality, particularly three, positioning appendages 71, each of which is suitable for being received in a corresponding recess 56 of the pre-assembled female mould arrangement 64 that is about to be mounted on the moulding machine. The positioning appendages 71 may protrude from an arcuate element 72 delimited by a coupling surface 73, the coupling surface 73 being conformed to engage in a shapingly coupled manner with a component of the male mould 2 interacting with the pre-assembled female mould arrangement 64 which is about to be mounted on the moulding machine. The coupling surface 73 may be shaped as a portion of a cylindrical surface. The component of the male mould 2 with which the coupling surface 73 engages may be an extractor element 80, shown in FIG. 12. The extractor element 80 is suitable for extracting the formed object from the mould, in particular by detaching the formed object from a punch of the male mould 2.

The phasing tool 69 may further comprise a further coupling surface 74 configured to engage, in a shapingly coupled manner, with a component fixed relative to a further male mould 2 of the moulding machine. In particular, the coupling surface 74 can be configured to engage, in a shapingly coupled manner, with the extractor element 80a of a male mould 2 adjacent to the male mould 2 which is interacting with the pre-assembled female mould arrangement 64 that is about to be mounted on the moulding machine. Also the further coupling surface 74 may be shaped as a portion of a cylindrical surface.

The coupling surface 73 and the further coupling surface 74 therefore act as coupling elements which are suitable for coupling with a further reference part already installed on the moulding machine, on which the pre-assembled female mould arrangement 64 is about to be mounted.

The further reference part, which is external to the pre-assembled female mould arrangement 64 and has already been properly installed on the moulding machine, is located in a pre-determined angular position, for example with respect to the axis of rotation of the carousel 68. When the coupling surface 73 and the further coupling surface 74 are coupled with the further reference part of the moulding machine, the phasing tool 69 is in a pre-determined angular position on the moulding machine. Since the angular positioning device 70 is in turn coupled with the reference part fixed relative to the pre-assembled female mould arrangement 64 to be installed, i.e. with the corresponding recesses 56, it is ensured that the pre-assembled female mould arrangement 64 at issue is arranged in an angular position, which is uniquely determined about the corresponding axis Z.

The coupling surface 73 and the further coupling surface 74 are provided on a common element 76, which projects as a cantilever from a support plate 77 of the phasing tool 69. On the common element 76 also the angular positioning device 70 is obtained. In this manner it is ensured that the angular positioning device 70, the coupling surface 73 and the further coupling surface 74 are fixed relative to one another and arranged in a reciprocal known and well-defined position.

A pair of pins 78 further project from the common element 76, the pins 78 being directed parallel to the axis Z and projecting from same side of the positioning appendages 71. The pins 78 allow the weight of the phasing tool 69 to be balanced, when the phasing tool 69 is being handled. Furthermore, the pins 78 define a sort of security support of the phasing tool 69 on the moulding machine, so as to prevent the phasing tool 69 from oversetting during use.

In order to install the pre-assembled female mould arrangement 64 on the moulding machine, it is possible to proceed as follows.

After bringing the female mould 1 to be installed and the associated male mould 2 in the engagement position, and after centering the pre-assembled female mould arrangement 64 with respect to the corresponding male mould 2, the phasing tool 69 is rested on the pre-assembled female mould arrangement 64 in such a way that the positioning appendages 71 engage inside the recesses 56 of the blocking ring 13. The coupling surface 73 is in contact with the outer surface of the extractor element 80.

Since the pre-assembled female mould arrangement 64 which is being installed is not, at this stage, yet completely fixed to the corresponding support 42, such arrangement—and consequently the corresponding blocking ring 13 with which the positioning appendages 71 are engaged—may be rotated about the axis Z in order to allow the phasing tool 69 to engage with the outer surface of the extractor element 80a which belongs to the male mould 2 adjacent to the male mould 2 interacting with the pre-assembled female mould arrangement 64. Thus the pre-assembled female mould arrangement 64 that is being installed, is placed in a pre-determined angular position on the moulding machine with respect for example to a moulding axis along which the female mould 1 and the male mould 2 are mutually movable.

At this point, when the pre-assembled female mould arrangement 64 is centered with respect to the corresponding male mould 2 and arranged in a correct angular position about the axis Z, the pre-assembled female mould arrangement 64 may be fixed to the corresponding support 42. This may be carried out by using a fastening tool 79, for example shaped like a screwing wrench having a concave portion which partially surrounds the stem 40, as shown in FIG. 12. The fastening tool 79 further has one or more pawls, not visible in FIG. 12, which project upwards so as to engage inside corresponding holes 50 obtained in the fastening ring 47. Thus, the pre-assembled female mould arrangement 64 may be fixed to the support 42, by screwing the external threaded zone 49 of the fastening ring 47 on the inner threaded zone 38 of the base 33. It is noted that the pre-assembled female mould arrangement 64 is arranged in the correct angular position while the male mould 2 is engaged inside the forming cavity 3. Furthermore, the pre-assembled female mould arrangement 64 is fixed to the support 42 while the phasing tool 69 is engaged with the pre-assembled female mould arrangement 64 to be installed and with the male mould 2 adjacent to the male mould 2 engaged in the forming cavity 3 of the pre-assembled female mould arrangement 64 to be installed.

In other words, the steps of centering the pre-assembled female mould arrangement 64 with respect to the corresponding male mould 2, angularly positioning the pre-assembled female mould arrangement 64 about the axis Z, and fixing the pre-assembled female mould arrangement 64 to the support 42, occur simultaneously.

It is thus possible to avoid undesired displacement of the pre-assembled female mould arrangement 64 while the latter is installed on the moulding machine and fixed to the corresponding support 42, thereby maximizing accuracy in assembly.

In the example shown, in order that the pre-assembled female mould arrangement 64 is angularly positioned onto the moulding machine, the phasing tool 69 uses a reference part which is fixed relative to the pre-assembled female mould arrangement 64 to be installed (i.e. the recesses 56), as well as a further reference part that is fixed with relative to components already installed on the moulding machine (i.e. the outer surface of the extractor element 80a of a male mould 2 adjacent to the female mould 1 to be installed).

In an alternative embodiment, other reference elements may also be used. For example, the further reference part already installed on the moulding machine could comprise any element of the carousel 68, or of male moulds 1 or of female moulds 2 adjacent to those to be installed, having a well-defined angular position which may be taken as a reference for positioning the pre-assembled female mould arrangement 64 which is being installed.

In any case, the pre-assembled female mould arrangement 64 can be placed in the correct angular position by using reference elements placed outside the pre-assembled female mould arrangement 64, which allows to avoid use of pins or other bulky and expensive reference elements to be housed inside the female mould 1.

The method, the tools and the pre-assembled female mould arrangement disclosed above may be used also to assemble female moulds having a different structure compared to the mould shown, for example female moulds in which the annular forming element 4 and the peripheral annular component 15 both abut against the plate element 5. In this case, the plate element 5 will have a diameter greater than the diameter of the plate element 5 of the example illustrated.

In any case, using a pre-assembled female mould arrangement allows to simplify assembly operations, as well as to increase flexibility and improve accuracy of such operations.

The invention claimed is:

1. A pre-assembled female mould arrangement for being installed on a moulding machine, the pre-assembled female mould arrangement comprising:
   an annular forming element, extending about an axis and delimiting a forming cavity about said axis;
   a plate element, which delimits the forming cavity transversely to said axis;
   a peripheral annular component that surrounds at least partially the annular forming element;
   a supporting base;
   a fastening element which is so mounted as to render the annular forming element fixed relative to the plate element.

2. A pre-assembled female mould arrangement according to claim 1, wherein the fastening element is fastened to the supporting base, the plate element and the annular forming element being clamped between the fastening element and the supporting base.

3. A pre-assembled female mould arrangement according to claim 1, wherein the fastening element comprises a blocking ring having an internal thread which engages with an external thread of the supporting base, the plate element and the peripheral annular component being housed inside the blocking ring.

4. A tool for assembling a pre-assembled female mould arrangement, the pre-assembled female mould arrangement comprising a plurality of components including at least a supporting base, a forming device having a forming cavity and a fastening element which renders the forming device fixed relative to the supporting base, wherein the tool comprises at least one angular positioning element for engaging with the fastening element in order to position the fastening element in a pre-determined angular position on the tool.

5. A tool according to claim 4, and further comprising at least one angular reference element suitable for engaging with an annular forming element of the forming device in order to position the annular forming element in a pre-determined angular position on the tool.

6. A tool according to claim 5, wherein a plurality of angular positioning elements and a plurality of angular reference elements are provided, the angular positioning elements being arranged along a first circumference and the angular reference elements being arranged along a second circumference, said first circumference and said second circumference being concentric to one another.

7. A tool according to claim 5, and further comprising a protuberance that projects from a face of said tool opposite a further face of said tool, said at least one angular positioning element and said at least one angular reference element being provided on said further face.

8. A combination of a pre-assembled female mould arrangement and a tool for assembling the pre-assembled female mould arrangement, wherein the pre-assembled female mould arrangement comprises:
   an annular forming element, extending about an axis and delimiting a forming cavity about said axis;
   a plate element, which delimits the forming cavity transversely to said axis;
   a peripheral annular component that surrounds at least partially the annular forming element;
   a supporting base;
   a fastening element which is so mounted as to render the annular forming element fixed relative to the plate element,
and wherein the tool comprises at least one angular positioning element for engaging with the fastening element in order to position the fastening element in a pre-determined angular position on the tool.

* * * * *